T. M. WILSON.
DRIER.
APPLICATION FILED AUG. 28, 1911.
1,027,513.
Patented May 28, 1912.
7 SHEETS—SHEET 1.
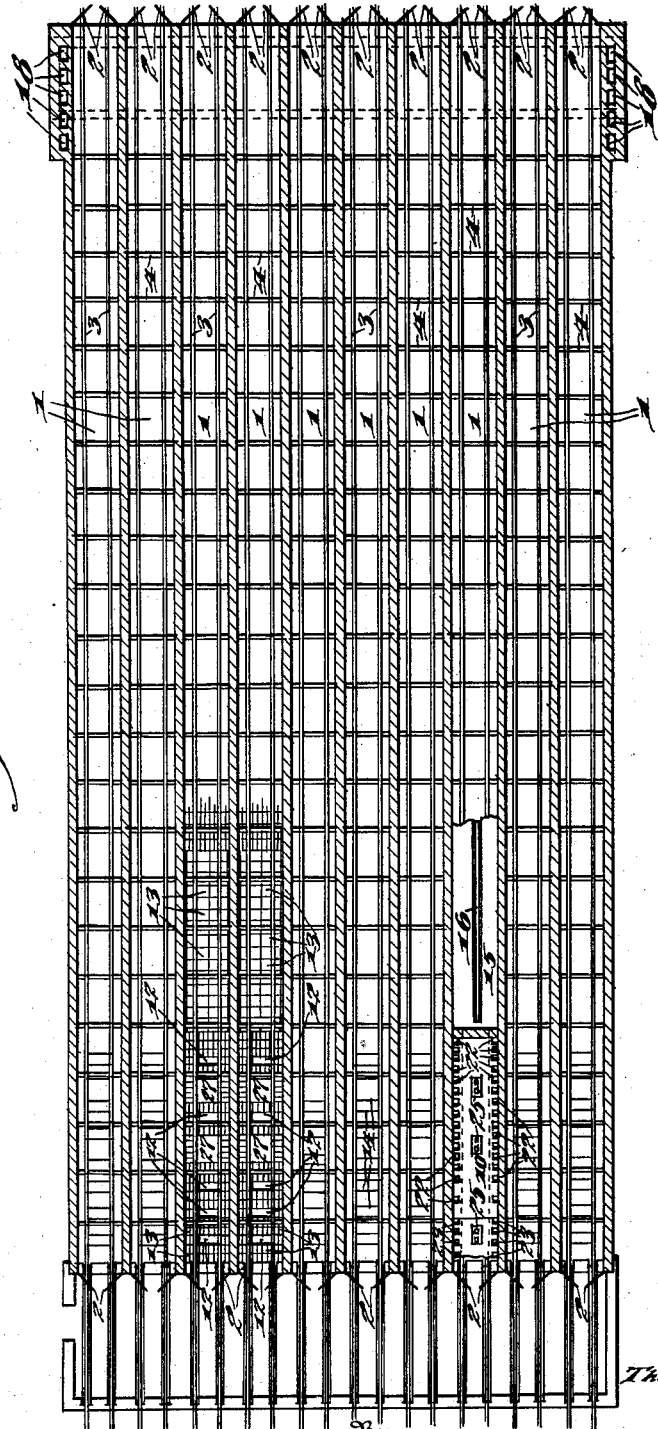
Witnesses
Theo. Rosemann
R. H. Krenkel
Inventor
Thomas M. Wilson,
By Joshua R. H. Potts,
Attorney

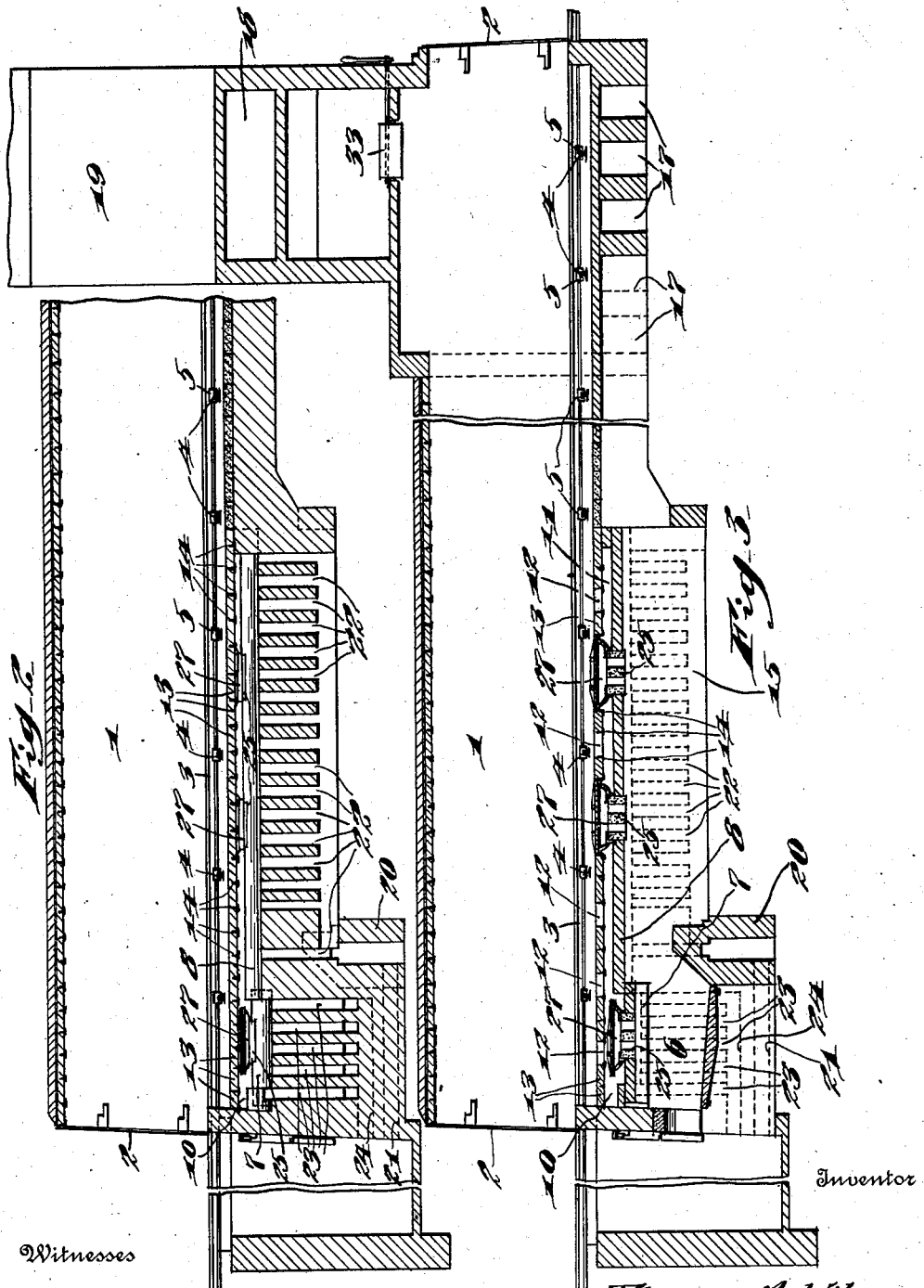

T. M. WILSON.
DRIER.
APPLICATION FILED AUG. 28, 1911.
1,027,513.
Patented May 28, 1912.
7 SHEETS—SHEET 3.
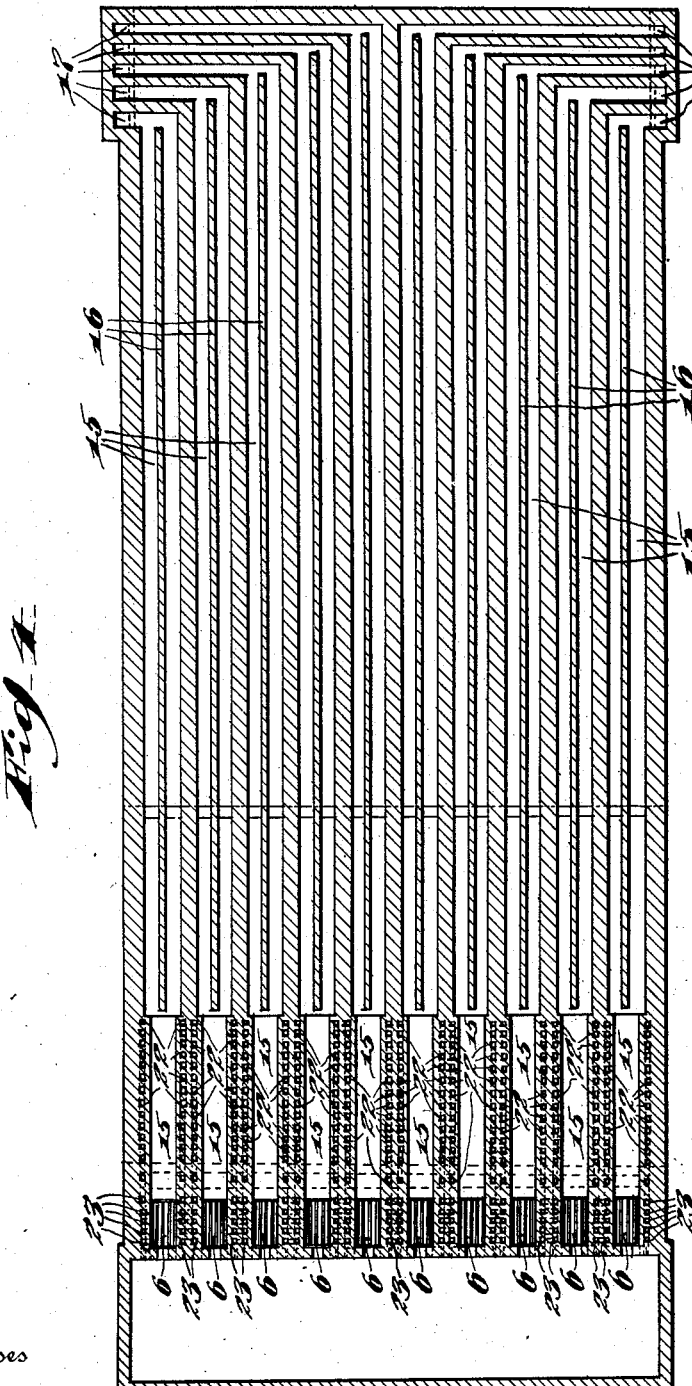
Witnesses
Inventor
Thomas M. Wilson,
By Joshua R. H. Potts
Attorney

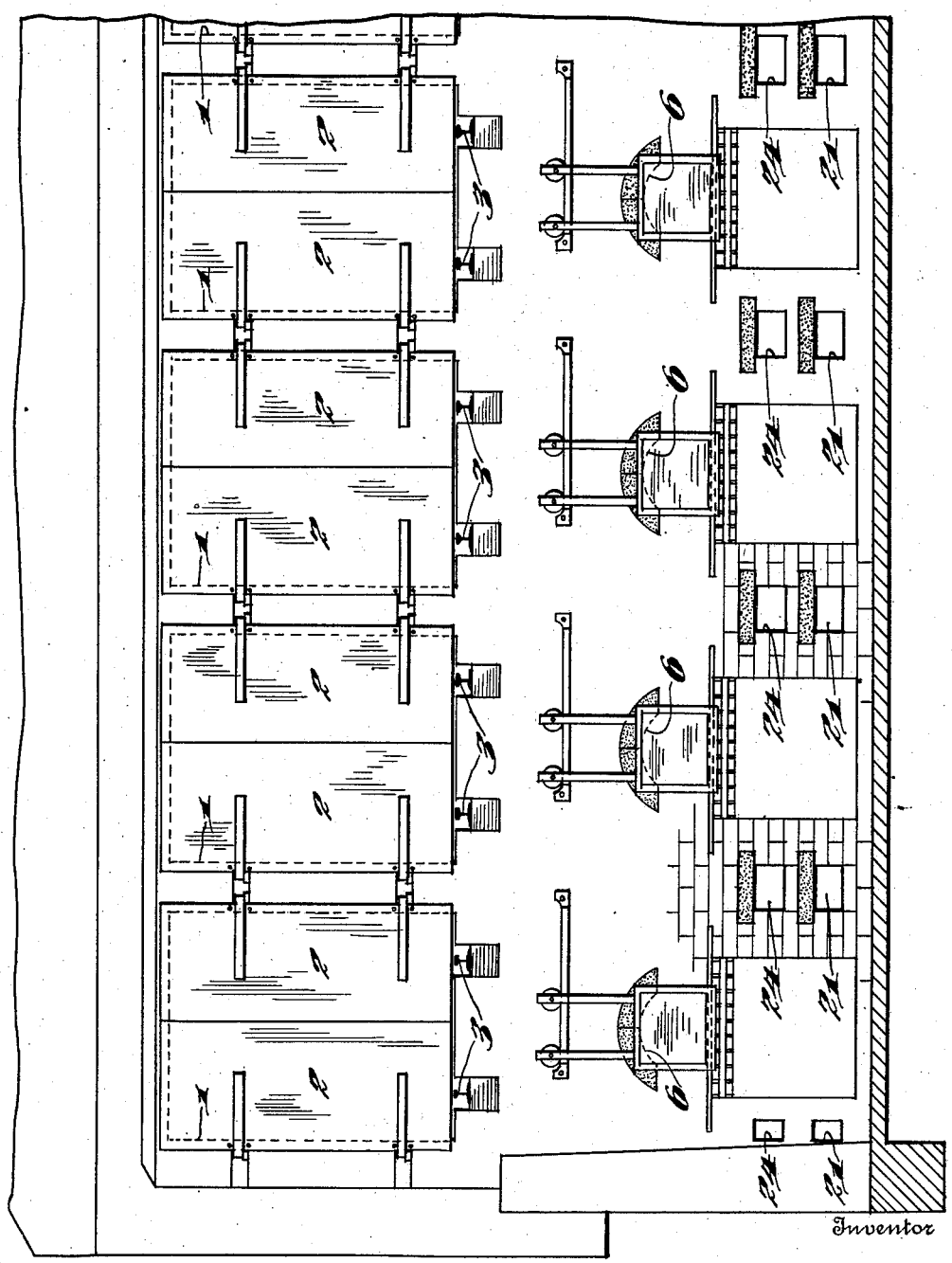

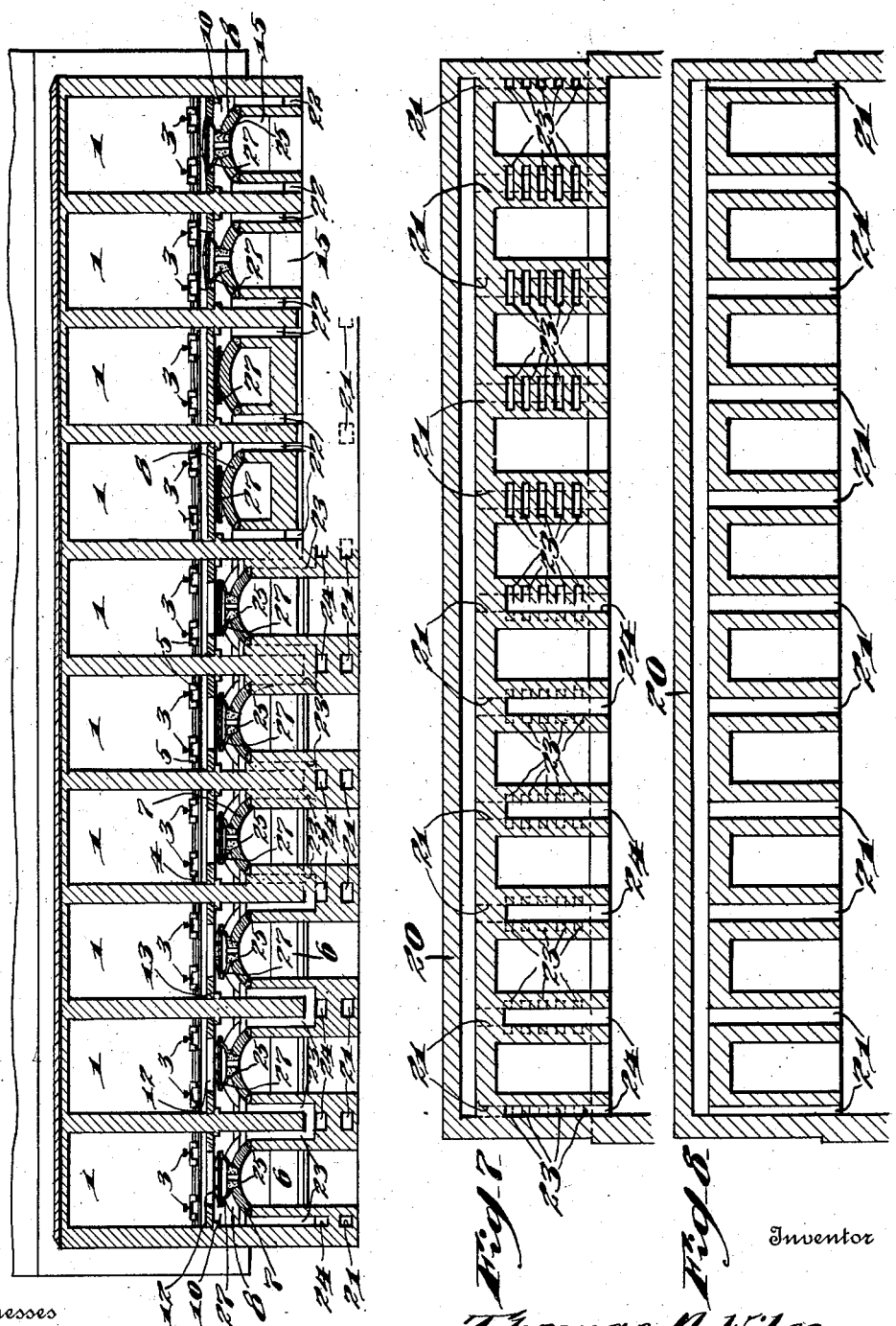

T. M. WILSON.
DRIER.
APPLICATION FILED AUG. 28, 1911.
1,027,513.
Patented May 28, 1912.
7 SHEETS—SHEET 6.
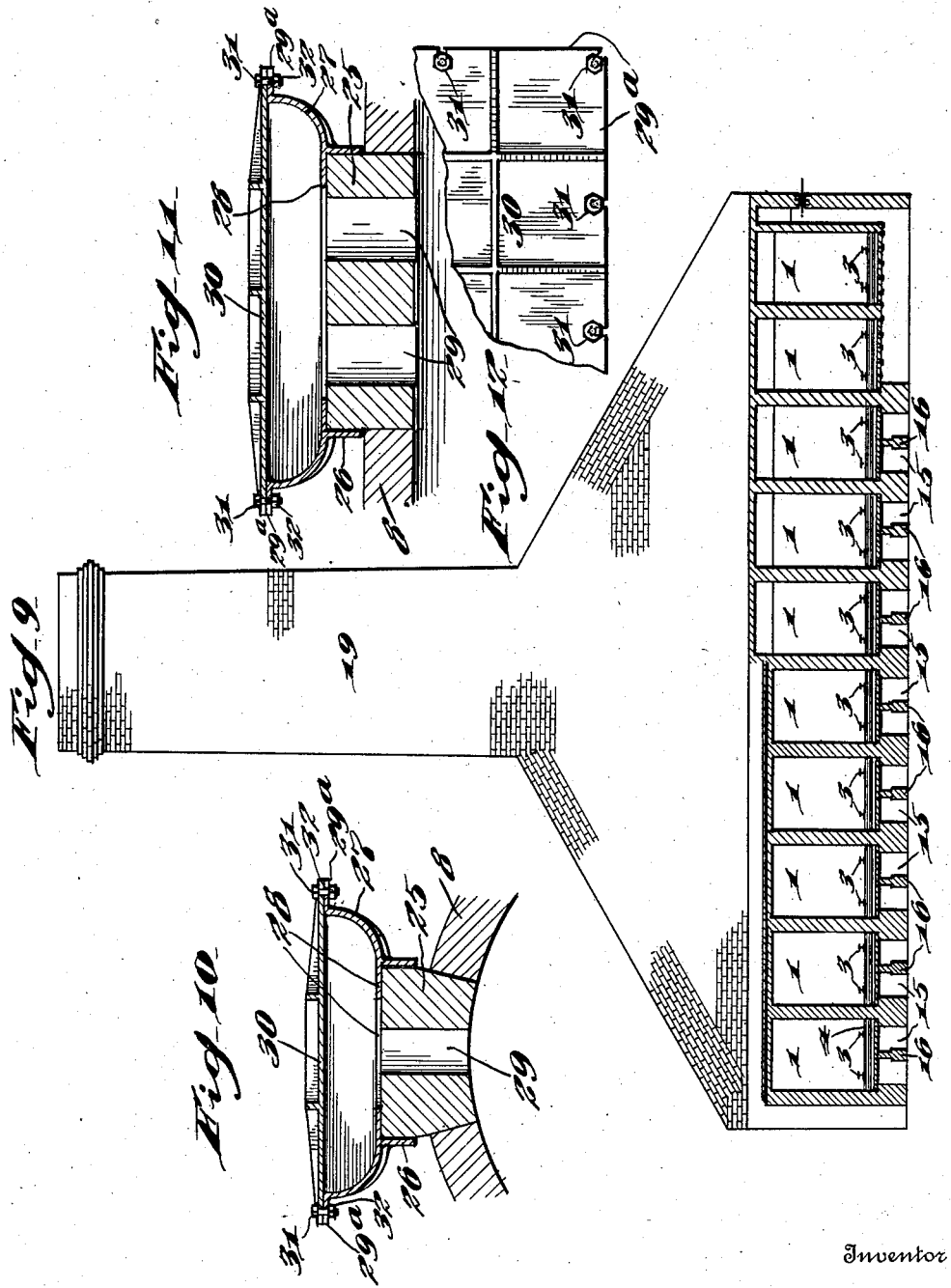

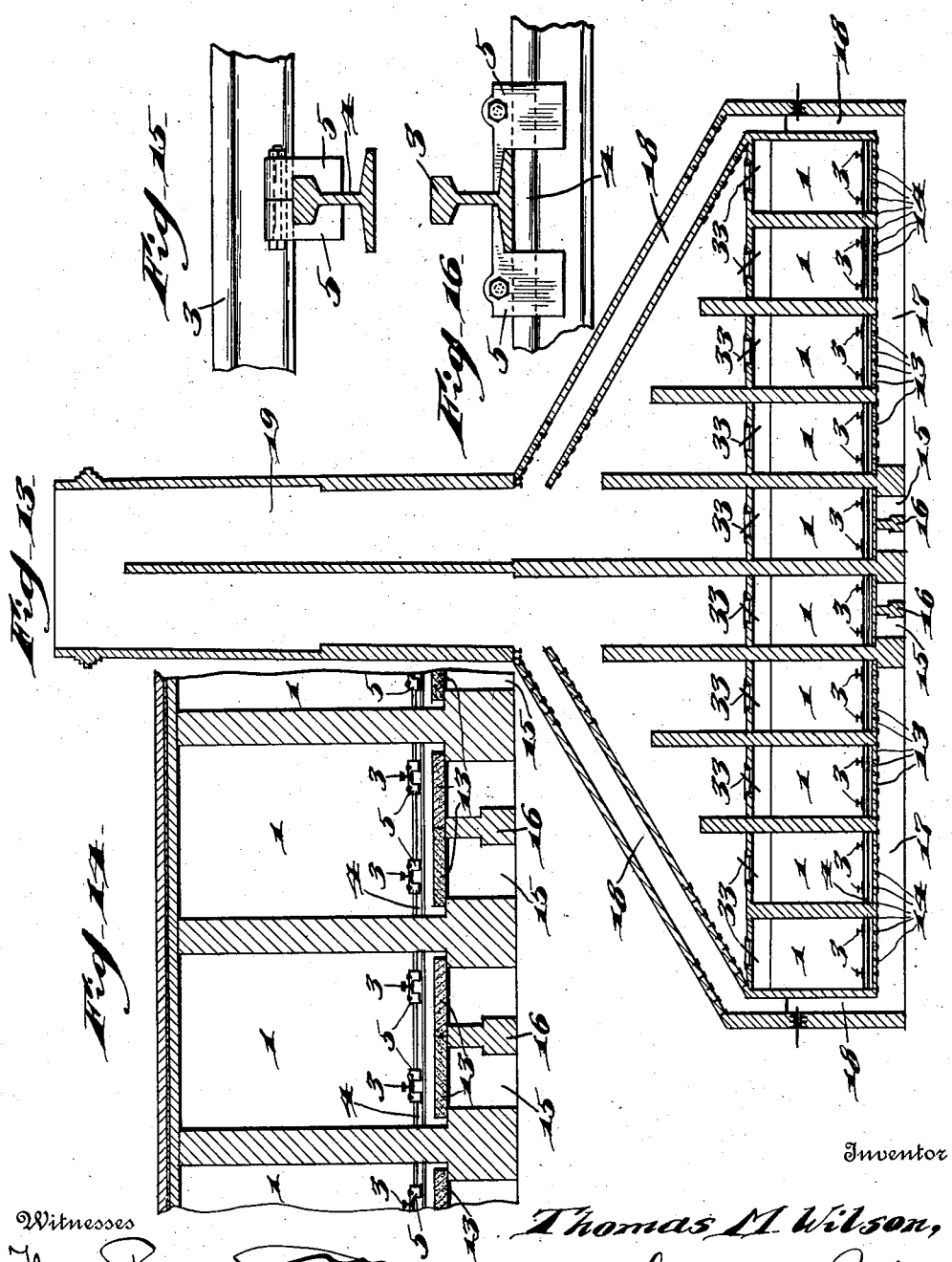

UNITED STATES PATENT OFFICE.

THOMAS M. WILSON, OF PHILADELPHIA, PENNSYLVANIA.

DRIER.

1,027,513.   Specification of Letters Patent.   Patented May 28, 1912.

Application filed August 28, 1911. Serial No. 646,299.

*To all whom it may concern:*

Be it known that I, THOMAS M. WILSON, a citizen of the United States, residing at Philadelphia, in the county of Philadelphia and State of Pennsylvania, have invented certain new and useful Improvements in Driers, of which the following is a specification.

My invention relates to improvements in driers, more particularly designed for drying brick and the like, the object of the invention being to provide an improved construction, whereby an improved radiation of heat is had to insure a more perfect drying operation.

A further object is to provide a drier having an improved arrangement of flues, air spaces and passages in combination with metal radiators interposed between the flues for smoke and gases and the passages for air, whereby said metal radiators radiate into the air passages the maximum heat units of the fuel consumed.

A further object is to provide in combination with radiators, an improved arrangement of flues and passages, whereby the brick may be heated more uniformly and in less time than heretofore, and embody in such construction of drier, slip joint furnace crowns and other structural details, whereby a drier superior in many ways to driers in general use is had.

With these and other objects in view, the invention consists in certain novel features of construction and combinations and arrangements of parts as will be more fully hereinafter described and pointed out in the claims.

In the accompanying drawings: Figure 1, is a floor plan view partly broken away to illustrate the arrangement of flues below. Fig. 2, is a fragmentary view in longitudinal section through one of the tunnels and the air passages at one side of a furnace. Fig. 3, is a view in longitudinal section through the center of one of the furnaces. Fig. 4, is a flue plan. Fig. 5, is a fragmentary view in front elevation. Fig. 6, is a staggered view in vertical transverse section through the furnaces and flues back of the same. Fig. 7, is a view in horizontal section through the upper air inlet ports 24. Fig. 8, is a similar view through the lower inlet ports 21. Fig. 9, is a staggered vertical transverse section through the drier. Figs. 10, 11, and 12 are enlarged detail views illustrating one of the radiators. Fig. 13, is a staggered view in vertical transverse section through the stack. Fig. 14, is an enlarged fragmentary vertical transverse section illustrating the flues, floors and rails, and Figs. 15, and 16, are enlarged detail views illustrating the rail joint or connections.

My improved drier is made with a series of parallel longitudinal tunnels 1, having suitable doors 2 at the ends, and provided with tracks 3 to support the cars (not shown) which are moved through the drier. The rails 3 are supported on transverse rails 4, extending through the drier, and positioned above the floor. Suitable clamps 5 are provided to secure the rails 3 and 4 together, and these transverse rails are supported in the upright walls of the drier and sustain the weight of the cars, relieving the floor of such weight which permits the floor to be made relatively thin, so as to facilitate the heat radiation.

Each tunnel 1 is provided at one end of the kiln and below the tunnel floor, with a furnace 6, the crown of said furnace comprising overlapping sections 7 and 8, which allow for the extension and contraction due to the heat, and prevent injury due to this cause. That portion of the crown 7 which is directly over the furnace, is, as a matter of fact, the furnace crown proper, is lower than the crown 8 which extends rearwardly from the furnace, and is really a flue crown. Therefore, for convenience of description, the lower crown I shall term the furnace crown, and the higher crown, the flue crown. This different elevation of crowns provides a relatively large air chamber 10 above each furnace, which communicates with a longitudinal air flue 11, which extends throughout a portion of the tunnel floor and communicates therewith by means of openings 12. These openings 12 are formed by leaving out tiles in the floor, and the said tiles 13 are supported in transverse angle irons 14.

The crowns 8 above referred to form covers for main fire flues 15, which are divided by longitudinal cords 16, and are made with laterals 17 at their ends, communicating with flues 18 in stack 19 at the rear end of the drier.

Between the furnaces 6 and the flues 15, hollow bridge walls 20 are provided. These bridge walls 20 have inlet flues 21 which extend through the front wall of the drier, and they communicate with vertical flues 22 beside the fire and smoke flues 15, and are adapted to direct the air into the air space 11. In the walls, between the several furnaces, vertical flues 23 are provided which connect the air spaces 10 with horizontal inlet flues 24, the latter extending through the front wall of the drier and located above the flues 21.

In the crowns 7 and 8, radiator supporting tiles 25 are built, and constitute a part of such structures. By reference particularly to Figs. 10, 11, and 12, it will be seen that these tiles 25 operate as keystones of the arch, and extend above the arch and into the flanged lower ends 26 of hollow radiators 27. These radiators 27 are preferably castings, having open bottoms 28 communicating with openings 29 in the tile 25. The upper edge of each radiator is provided with an outwardly projecting notched flange 29ª to support a ribbed cover 30. This ribbed cover 30 is also notched at its edges, and in the notches of the cover and the flange, bolts 31 are secured by nuts 32, so as to render the radiators air tight. The smoke and gases from below fill the radiators and the metal rapidly radiates the heat into the air spaces above. One set of radiators (the front set) heats the air in the passage 11, which of course, is also assisted by the rear radiators, but the latter discharge the greater portion of their heat directly into the tunnels. The floor 13 of each tunnel also serves as a radiating medium for the heat, but the metal radiators greatly increase the radiation of heat and utilize to a maximum degree the heat units in the fuel. The stack 19 also constitutes an outlet for the air from the several tunnels, the roofs of said tunnels having dampered communication 33 with said stack.

In operation, air enters the flues 24, passes up the vertical flues 23 in the partition walls between the furnaces and discharges into the chambers 10. It is, of course, heated in this passage to the chamber 10, and is further heated by the front radiators 27. The chambers 10 and 11 constitute an air heating space located between the furnace crown and the floor of the drier, and while, of course, the air is heated in its passage to this chamber, it receives in the chamber the maximum of heat units before discharging into the drier. By reason of the shape of the crown, the air which passes up through the walls is deflected over toward the center where it comes into contact with the highly heated air about the radiators as shown in Fig. 6, and escapes through the floor directly under the cars in a highly heated condition. This highly heated air passes up into the front ends of the several tunnels, and then travels longitudinally of the tunnels to the rear ends. Air also enters the flues 21, passes through the hollow bridge wall 20, up through the vertical flues 22 into the passage 11, and from thence into the tunnels. The heat, therefore, enters the tunnels at their forward ends, and this heat which is stored in the air, insures a continuous maximum supply of hot dry air to the bricks in the several tunnels, and this air rapidly takes the moisture from the bricks, and escapes up the stack 19. By reason of the metal radiators in communication with furnaces and the smoke flues, a rapid interchange of temperatures is had between the smoke and gases, and the air on the opposite side of the radiator. The heat units are therefore rapidly transferred, so that the incoming air is highly heated. The radiation through the tile or brick of the several flues is also utilized, but the metal radiators insure a more rapid transfer of the heat units, and assist the radiation from the brick and tile in utilizing a far greater percentage of heat units of the fuel, than has been possible with driers of this kind as heretofore made.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a drier, the combination with a furnace, of a tunnel located above the furnace and having a floor spaced above the furnace forming a passage, a radiator in said passage and means for directing air into said passage and from the same into the tunnel, substantially as described.

2. In a drier, the combination with a drying chamber, a furnace, said chamber having a perforated floor which is spaced above the furnace so as to form an air passage, and a metal radiator communicating with the furnace and projecting into said air passage, substantially as described.

3. In a drier, the combination with a drying chamber, a furnace, said chamber having a perforated floor which is spaced above the furnace so as to form an air passage, and a metal radiator communicating with the crown of said furnace and projecting into the air passage, substantially as described.

4. In a drier, the combination with a drying chamber, a furnace below the drying chamber, a flue for smoke and gases extending below the drying chamber, said chamber having a floor which is spaced above the furnace and said flue whereby an air passage is formed between the floor and the roof of said furnace and said smoke flue, said air passage communicating with the drying chamber, and radiators communicating with the crown of furnace and the smoke flue and projecting into the said air passage, substantially as described.

5. In a drier, the combination with a tunnel and a furnace, of a metal radiator having an open top and interposed between the furnace and the tunnel, said radiator comprising a body, a depending flange around the body, a perforated tile forming a part of the drier structure and projecting into said flange, and a cover removably secured over the open top of said radiator, substantially as described.

6. In a drier, the combination with a drying chamber, a source of heat, and a metallic radiator having an open top and interposed between the drying chamber and the source of heat, said radiator comprising a body, a depending flange around the hollow body, a perforated tile forming a part of the drier structure and projecting into said flange, and a cover removably secured over the open top of said radiator, substantially as described.

7. In a drier, the combination with a drying chamber, a furnace, said chamber having a perforated floor which is spaced above the furnace so as to form an air passage between the furnace and the floor, a metal radiator having an open top and communicating with the furnace and projecting into said air passage, said radiator comprising a body, a depending flange around the body, a perforated tile forming a part of the drier structure and projecting into said flange, and a cover removably secured over the open top of said radiator, substantially as described.

8. In a drier, the combination with a drying chamber, a furnace, said chamber having a floor spaced above the furnace so as to form an air passage between the furnace and the floor, a metal radiator having an open top and communicating with said furnace and projecting into the air passage, said radiator comprising a body, a depending flange around the body, a perforated tile forming a part of the drier structure and projecting into said flange, and a cover removably secured over the open top of said radiator, substantially as described.

9. In a drier, the combination with a drying chamber, a furnace below the drying chamber, a flue for smoke and gases extending below the drying chamber, said chamber having a floor spaced above the furnace and the flue so as to form an air passage between the floor and the furnace and said smoke flue, said air passage communicating with the drying chamber, and radiators having open tops and communicating with the furnace and the smoke flues and projecting into the said air passage, each radiator comprising a body, a depending flange around the body, a perforated tile forming a part of the drier structure and projecting into said flange, and a cover removably secured over the open top of said radiator, substantially as described.

10. In a drier, the combination with a plurality of parallel tunnels, furnaces below said tunnels, smoke flues below said tunnels, crowns on said furnaces and flues overlapping each other, and metal radiators communicating with the crowns of said furnaces and flues, and radiating heat into the tunnels, substantially as described.

11. In a drier, the combination with a plurality of parallel tunnels, furnaces below said tunnels, smoke flues below said tunnels, crowns on said furnaces and flues overlapping each other, hollow bridge walls between the furnaces and the flues, vertical air flues in the walls of the drier, air inlets in the end of the drier communicating with said vertical flues, said tunnels having floors spaced above the furnaces and the flue crowns and forming air passages between said floors and the furnace and flue crowns, and metal radiators in said crowns and radiating into said last-mentioned air passages, substantially as described.

12. In a drier, the combination with a plurality of parallel tunnels, furnaces below said tunnels, smoke flues below said tunnels, crowns on said furnaces and flues overlapping each other, hollow bridge walls between the furnaces and the flues, vertical air flues in the walls of the drier, air inlets in the end of the drier communicating with said vertical flues, tunnels having floors spaced above the furnaces and the flue crowns and forming air passages between said floors and the furnace and flue crowns, and metal radiators in said crowns and radiating into said last-mentioned air passages, and a stack common to said smoke flues and said tunnels, substantially as described.

13. In a drier, the combination with a plurality of parallel tunnels, furnaces below said tunnels, smoke flues below said tunnels, crowns on said furnaces and flues overlapping each other, hollow bridge walls between the furnaces and the flues, vertical air flues in the walls of the drier, air inlets in the end of the drier communicating with said vertical flues, tunnels having floors spaced above the furnaces and the flue crowns and forming air passages between said floors and the furnace and flue crowns, and metal radiators in said crowns and radiating into said last-mentioned air passages, car supporting tracks in said tunnels, and means supporting said tracks above the floors of said tunnels, substantially as described.

14. In a drier, the combination with a plurality of parallel tunnels, furnaces below said tunnels, smoke flues below said tunnels, crowns on said furnaces and flues overlapping each other, hollow bridge walls between the furnaces and the flues, vertical air flues in the walls of the drier, air inlets in the end of the drier communicating with said vertical flues, tunnels having floors spaced above the furnaces and the flue crowns and forming air passages between said floors and the furnace and flue crowns, and metal radiators in said crowns and radiating into said last-mentioned air passages, a stack common to said smoke flues and said tunnels, car supporting tracks in said tunnels, and means supporting said tracks above the floors of said tunnels, substantially as described.

15. In a drier, the combination with a drying chamber, a furnace below the drying chamber, a flue for smoke and gases extending below the drying chamber, said chamber having a floor which is spaced above the furnace and said flue whereby an air passage is formed between the floor and the roof of said furnace and said smoke flue, said air passage communicating with the drying chamber, and radiators communicating with the crown of furnace and the smoke flue and projecting into the said air passage, car supporting rails in the drying chamber extending longitudinally thereof, and means supporting said rails above the floor of said chamber, substantially as described.

16. In a drier, the combination with a drying chamber, a furnace, said chamber having a perforated floor which is spaced above the furnace so as to form an air passage between the furnace and the floor, a metal radiator having an open top and communicating with the furnace and projecting into said air passage, said radiator comprising a body, a depending flange around the body, a perforated tile forming a part of the drier structure and projecting into said flange, and a cover removably secured over the open top of said radiator, car supporting rails in the drying chamber extending longitudinally thereof, and means supporting said rails above the floor of said chamber, substantially as described.

In testimony whereof I have signed my name to this specification in the presence of two subscribing witnesses.

THOMAS M. WILSON.

Witnesses:
S. W. FOSTER,
CHARLES E. POTTS.

---

Copies of this patent may be obtained for five cents each, by addressing the "Commissioner of Patents, Washington, D. C."